United States Patent
Jain et al.

(10) Patent No.: US 12,511,925 B1
(45) Date of Patent: Dec. 30, 2025

(54) SYSTEM AND METHOD FOR SEMI-AUTOMATED DATASET ANNOTATION USING SIMILARITY BASED CLUSTERING AND IN-CONTEXT LEARNING FOR SEGMENTATION

(71) Applicant: QpiAI India Private Limited, Nagavara (IN)

(72) Inventors: Arpit Jain, Bangalore (IN); Animesh Tripathy, Bangalore (IN); Aswanth Krishnan, Bengaluru (IN); Hitesh Daksh, Bangalore (IN); Sachin Kumar, Bengaluru (IN); Nagendra Nagaraja, Bangalore (IN)

(73) Assignee: QpiAI India Private Limited, Bangalore (IN)

( * ) Notice: Subject to any disclaimer, the term of this patent is extended or adjusted under 35 U.S.C. 154(b) by 0 days.

(21) Appl. No.: 19/316,946

(22) Filed: Sep. 2, 2025

(30) Foreign Application Priority Data

Apr. 1, 2025 (IN) .............................. 202541032219

(51) Int. Cl.
| | |
|---|---|
| *G06V 10/00* | (2022.01) |
| *G06V 10/74* | (2022.01) |
| *G06V 10/762* | (2022.01) |
| *G06V 10/94* | (2022.01) |
| *G06V 20/70* | (2022.01) |

(52) U.S. Cl.
CPC ............ *G06V 20/70* (2022.01); *G06V 10/761* (2022.01); *G06V 10/762* (2022.01); *G06V 10/945* (2022.01)

(58) Field of Classification Search
CPC ........ G06N 20/00; G06N 20/10; G06N 20/20; G06N 20/70; G06V 10/82; G06V 10/761; G06V 10/762; G06V 10/764; G06V 10/765; G06V 10/7715; G06V 10/945; G06F 16/285; G06F 16/355; G06F 18/23
See application file for complete search history.

(56) References Cited

U.S. PATENT DOCUMENTS

| | | | | |
|---|---|---|---|---|
| 6,085,225 | A * | 7/2000 | Nakajima | G06F 16/958 709/219 |
| 6,718,674 | B2 * | 4/2004 | Caveney | H01R 13/465 40/642.02 |
| 9,665,660 | B2 * | 5/2017 | Wensel | G06F 16/9024 |
| 10,853,696 | B1 * | 12/2020 | Luo | G06N 3/0464 |

(Continued)

*Primary Examiner* — Amir Alavi
(74) *Attorney, Agent, or Firm* — Foley & Lardner LLP

(57) ABSTRACT

A method receiving a dataset including a plurality of images, executing an embedding model using the plurality of images to generate a plurality of image embeddings, clustering the plurality of image embeddings into a plurality of clusters based on similarities between the plurality of image embeddings, determining a density for each cluster based on an aggregate similarity of image embeddings of the cluster, based on the density for each of the plurality of clusters satisfying a criterion, for each cluster: receiving a first set of annotations for one or more pixels of each of a first subset of the images included in the cluster, inputting the annotated first subset of images into a vision transformer with a remaining unannotated subset of images not included in the annotated first subset, and generating a second plurality of annotations for the remaining unannotated subset of images not included in the annotated first subset.

20 Claims, 6 Drawing Sheets

(56) References Cited

U.S. PATENT DOCUMENTS

| | | | |
|---|---|---|---|
| 11,514,238 B2 * | 11/2022 | Begun | G06F 16/2457 |
| 11,640,294 B2 * | 5/2023 | Garg | G06F 8/73 |
| | | | 706/46 |
| 12,008,024 B2 * | 6/2024 | He | G06F 16/313 |
| 12,016,694 B2 * | 6/2024 | Li | A61B 5/366 |
| 12,182,149 B1 * | 12/2024 | Krishna | G06F 16/248 |
| 12,266,209 B1 * | 4/2025 | Bryslawskyj | G06V 20/70 |
| 12,380,157 B2 * | 8/2025 | Krishna | G06F 16/532 |
| 2021/0233646 A1 * | 7/2021 | Le Naour | G06Q 10/103 |

* cited by examiner

SYSTEM AND METHOD FOR SEMI-AUTOMATED DATASET ANNOTATION USING SIMILARITY BASED CLUSTERING AND IN-CONTEXT LEARNING FOR SEGMENTATION

CROSS-REFERENCE TO RELATED APPLICATIONS

This application claims the benefit of priority to Indian Provisional Application No. 202541032219, filed Apr. 1, 2025, the entirety of which is incorporated by reference herein.

BACKGROUND

Large datasets of images can be annotated using machine learning models. Annotating datasets can be time consuming, and automated annotating processes can be computationally expensive and lack robustness.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
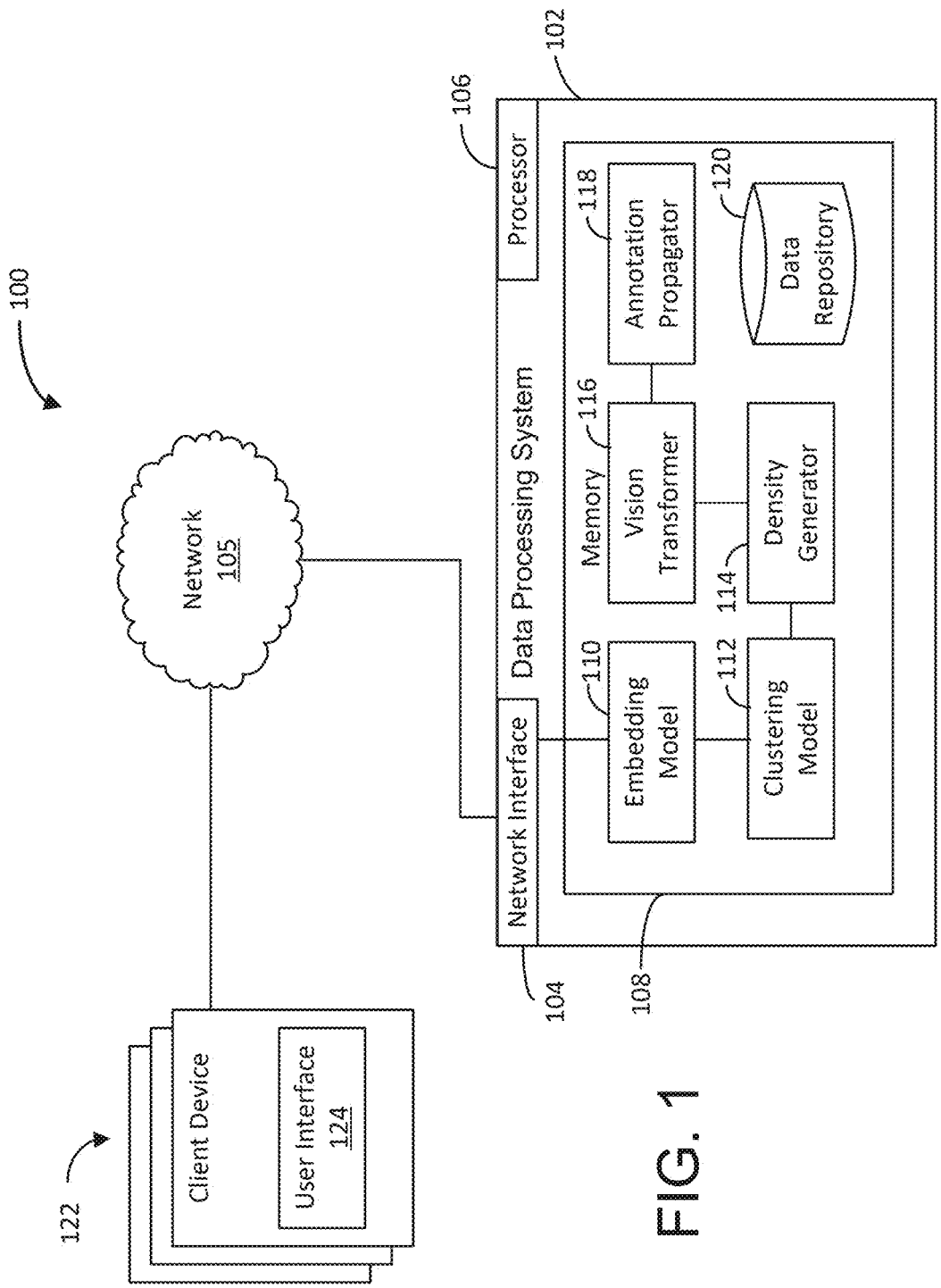
FIG. 1 is a block diagram illustrating an example system for annotating a dataset using machine learning, in accordance with one or more implementations.

Below are detailed descriptions of various concepts related to, and approaches, methods, apparatuses, and systems for implementing the various techniques described herein. The various concepts introduced above and discussed in greater detail below may be implemented in any of numerous ways, as the described concepts are not limited to any particular manner of implementation. Examples of specific implementations and applications are provided primarily for illustrative purposes.

This disclosure relates to techniques for annotating data included in a dataset using machine learning techniques. Specifically, this disclosure relates to annotating images included in a large and/or diverse dataset. Various methods exist for annotating images. Manual annotation involves humans annotating each image included in a dataset. In various embodiments, a human may draw pixel-level annotation masks for each image in a dataset. This can be time-consuming and, while manual annotation methods may not be computationally expensive, they may be financially costly. Manual annotation methods may also be difficult to scale. Humans may be unable to annotate datasets, particularly large datasets, in an efficient manner or in a reasonable length of time.

Semi-automated annotation methods also exist. These methods allow users to generate annotations using artificial intelligence-powered features. However, these systems are unable to accurately generate annotations for diverse and/or large datasets. Further, the amount of human input may still be sufficiently large, especially at scale, that these semi-automated methods are time-consuming.

Automated annotation methods may be able to rely less on human annotators to quickly annotate images. Particularly, automated annotation methods utilize active learning to partially annotate a dataset. The partially annotated dataset is used to train segmentation models that are used to annotate the remaining images in a dataset. While this allows datasets, especially large datasets, to be annotated more quickly than using a manual or semi-automated annotation processes, automated annotation is computationally expensive. Further, as a human is required to partially annotate a dataset, human input is still required, and a substantial human effort may be involved in large datasets. Further, current automated annotation methods are unable to accommodate diverse datasets with varying, dissimilar images. These models may also be prone to overfitting, leading to inaccurate annotations.

As such, the systems and methods described herein provide an improved method of semi-automated dataset annotation. Particularly, the systems and methods utilize similarity-based clustering and in-context learning for segmentation to provide accurate annotations for large, diverse datasets without relying too heavily on manual annotation from a human. The system receives a dataset that includes a plurality of images and embeds each image. The system then clusters the embeddings into a plurality of clusters based on how similar each cluster is to one another. That is, similar images, as determined by a similarity between the embeddings corresponding to the images, are clustered together. A density of each cluster is determined that represents how similar the images in a cluster are. For each cluster, a user can manually annotate a subset of the images. Specifically, the user may only have to annotate a small number of images (e.g., 3 images, 4 images, 5 images, etc.) to be able to generate accurate annotations for the remaining images not annotated by the user using a computer vision model.

As such, the systems and methods described herein support large scale image data set annotations, specifically for segmentation tasks. By dividing images into a plurality of clusters based on similarities, the system can accurately generate annotations for diverse datasets. Further, the use of one or more computer vision models (e.g., vision transformers) allows for in-context learning such that the annotations generated by the computer vision models (that are trained on the human-annotated images) are more accurate, particularly compared to current semi-automated and fully automated annotation processes. Further, the systems and methods described herein reduce reliance on manual annotation, as a human many only have to annotate a small number of images to allow the computer vision models to be trained to provide accurate annotations. As such, the systems and methods described herein allow for scalability and annotation of large datasets. The system also allows for receipt of user feedback to improve annotation quality.

FIG. 1 is an illustration of a system 100 for annotating data in a dataset using one or more machine learning models, in accordance with an implementation. In brief overview, the system 100 can include, access, or otherwise interface with a data processing system 102 that communicates with one or more client devices 122 via a network 105. The client device 122 may be an example of a user equipment (UE) or another device that can access the network 105. The client device 122 can communicate with the data processing system 102 to transmit and receive images and corresponding annotations for each of the images. The client device 122 and the data processing system 102 can communicate or interface with via the network 105 or directly.

Each of the client devices 122 and/or the data processing system 102 can include or utilize at least one processing unit or other logic device such as programmable logic array engine, or module configured to communicate with one another or other resources or databases. The components of the client devices 122 and/or the data processing system 102 can be separate components or a single component. In some embodiments, the data processing system 102 may be an intermediary device between the client devices 122 and one or more service providers. The system 100 and its components can include hardware elements, such as one or more processors, logic devices, or circuits.

The client devices 122 and/or the data processing system 102 can include or execute on one or more processors or computing devices (e.g., the computing system 600 depicted in FIG. 6) and/or communicate via the network 105. The network 105 can include computer networks such as the Internet, local, wide, metro, or other area networks, intranets, satellite networks, and other communication networks such as voice or data mobile telephone networks. Via the network 105, the client device 122 can access information resources such as web pages, web sites, domain names, or uniform resource locators that can be presented, output, rendered, or displayed on at least one computing device (e.g., client device 122), such as a laptop, desktop, tablet, personal digital assistant, smart phone, portable computers, or speaker.

The network 105 may be or include mobile telephone networks using any protocol or protocols used to communicate among mobile devices, including universal mobile telecommunications system ("UMTS"), 4G, long term evolution wireless broadband communication ("LTE"), 5G, etc. Different types of data may be transmitted via different protocols, or the same types of data may be transmitted via different protocols. In some embodiments, the network 105 may be or include a self-organizing network that implements a machine learning model to automatically adjust connections and configurations of network elements of network 105 to optimize network connections (e.g., minimize latency, reduce dropped calls, increase data rate, increase quality of service, etc.).

The client device 122 can communicate with the data processing system 102. For example, a user associated with the client device 122 may interact with the client device to transmit and receive signals from the data processing system 102.

The data processing system 102 may comprise a network interface 104, a processor 106, and/or memory 108. The data processing system 102 may communicate with any of the client devices 122 via the network interface 104. The processor 106 may be or include an ASIC, one or more FPGAs, a DSP, circuits containing one or more processing components, circuitry for supporting a microprocessor, a group of processing components, or other suitable electronic processing components. In some embodiments, the processor 106 may execute computer code or modules (e.g., executable code, object code, source code, script code, machine code, etc.) stored in the memory 108 to facilitate the operations described herein. The memory 108 may be any volatile or non-volatile computer-readable storage medium capable of storing data or computer code.

The memory 108 may include one or more of an embedding model 110, a clustering model 112, a density generator 114, a vision transformer 116, an annotation propagator 118, and/or a data repository 120. Each of the components 110-120 can include instructions that, when executed by the processor 106, can cause the processor 106 to operations indicated by the instructions.

The embedding model 110 generates embeddings of images. The embedding model 110 can be or include a neural network, a transformer, an encoder, or a large language model that is configured to generate embeddings (e.g., numerical vectors). For instance, the embedding model 110 may be one of various types of models, such as a classifier-based convolutional neural network (CNN), a vision transformer, a contrastive model, such as a contrastive language-image pre-training (CLIP) model, and/or any domain-specific or fine-tuned embedding model. The embedding model 110 may use deep learning to generate deep learning-based embeddings to accurately represent the semantics and features of each image. The embedding model 110 can generate the embeddings in a particular embedding space for which the embedding model 110 is configured to generate embeddings from images to accurately represent the images (e.g., the semantics of the images).

The data processing system 102 may receive one or more images provided by a user to and generate annotations for the images (e.g., on a pixel level). A user of a client device 122 may upload, or the data processing system 102 may otherwise receive, a dataset that includes a plurality of images that the user wishes to have annotated. In various embodiments, the dataset that includes the plurality of images may be transmitted from the client device 122 and stored in the data repository 120. The dataset may be stored in the data repository 120 until the data processing system 102 annotates the images. The data repository 120 may store the images and their corresponding annotations after the data processing system 102 has annotated the images.

The embedding model 110 may receive the dataset including the plurality of images (e.g., from the client device 122 or the data repository 120). Upon receipt of the plurality of images, the embedding model 110 may generate a plurality of image embeddings. Specifically, the embedding model 110 may generate one image embedding for each of the plurality of images so that each image is represented by a single embedding and the semantics of each image are accurately represented.

Upon generating the image embeddings, the embedding model 110 may transmit the generated embeddings to the clustering model 112, or the clustering model 112 may otherwise receive the generated image embeddings. The clustering model 112 may be any model suitable for clustering any type of data. The clustering model 112 clusters the plurality of image embeddings into a plurality of clusters. The clustering model 112 may employ or utilize any type of clustering algorithm or method, such as, for example, k-means clustering, density-based clustering, distribution-based clustering, centroid-based clustering, hierarchical-based clustering etc. As will be described in greater detail herein, annotations may be generated on a cluster level (e.g., annotations are generated cluster by cluster).

In one example, the clustering model 112 clusters the image embeddings into clusters based on similarities between the image embeddings. For example, the clustering model 112 can cluster the image embeddings such that each of the image embeddings included in a particular cluster has a similarity score at or above a threshold value. The similarity score may indicate a similarity of the image embedding to the other image embeddings of the cluster. For instance, image embeddings may be included in a particular cluster when each image embedding is at or above a threshold level of similarity to all of the other image embeddings in a cluster. An image embedding may only be included in one cluster (e.g., an embedding may not be included in multiple clusters), in some cases.

Clustering may allow annotations generated by the vision transformer 116 to be more accurate and manage datasets with high variability or multiple categories of different types of images. Clustering also allows for scalability and effective, accurate generation of annotations for large datasets. Further, clustering allows for diverse representation across an entire dataset, thereby reducing potential biases during annotation.

Upon generating the clusters, the generated embeddings and clusters may be projected to a 2D space and displayed on the user interface 124 of the client device 122 for viewing by a user. The generated embeddings and clusters may be projected using, for example, a t-distributed stochastic neighbor embedding (t-SNE) method. This may allow a user to easily visualize the embeddings and clusters. Thus, the user may be able to evaluate the dataset. In various embodiments, a user may be able to specify, via an input to the user interface 124, a desired, target, or required number of clusters. For example, the user interface 124 may include a slider or other graphical user interface icon that the user can interact with to cause the clustering model 112 to recluster the image embeddings, such as to a desired number of clusters, such that the clusters have a desired density, etc.

Upon clustering the image embeddings, the density generator 114 determines a density of each cluster. To do so, for each generated cluster, the density generator 114 (or the clustering model 112) identifies a centroid of the cluster and determines a mean cosine distance of each point (e.g., embedding) in the cluster from the centroid. This determined distance may be a metric that indicates a density of the cluster. As used herein, a "density" of a cluster may refer to how similar the images in a cluster are to one another. For the clusters for a dataset, the more similar the images or embeddings in a particular cluster are, the better the generated annotations for the cluster will be. In various embodiments, a density value being at or above a particular threshold level (e.g., at or above 0.90, 0.95, 0.98, etc.) may indicate that the generated annotations may have at or above a threshold level of accuracy, precision, etc. Thus, a higher density corresponds to an increased annotation accuracy because the context for an in-context segmenter (which will be described in greater detail herein) is more similar to images that are to be annotated.

The density generator 114 may calculate or determine cluster densities as follows. $C=\{C_1, C_2, \ldots, C_k\}$ represents a set of K clusters.

$C_k=\{x_1^k, x_2^k, \ldots, x_n^k\}$ represents the set of $n_k$ embedding points in a particular cluster k.

$c_k$ is the centroid of cluster $C_k$ and $c_k$ is defined as $$c_k = \left(\frac{1}{n_k}\right) * \sum_{i=1}^{n_k} x_i^k$$

Cosine similarity between the centroid $c_k$ and a point $x_i^k$ is given by:

$$\cos(\theta_i^k) = \frac{(c_k \cdot x_i^k)}{(\|c_k\| * \|x_i^k\|)}$$

where "·" denotes a dot product and "|| ||" denotes a vector norm (i.e., magnitude).

The density of cluster $C_k$ is the average cosine similarity between the centroid and all points in the cluster:

$$D(C_k) = \left(\frac{1}{n_k}\right) * \sum_{i=1}^{n_k} \frac{(c_k \cdot x_i^k)}{(\|c_k\| * \|x_i^k\|)}.$$

The overall average density of the dataset is represented as:

$$D_{overall} = \left(\frac{1}{K}\right) * \sum_{k=1}^{K} D(C_k).$$

A user may set a number of desired or target clusters (e.g., based on a number that is ideal for the particular dataset, etc.). The user may do so by providing an input into the user interface, such as by adjusting the sliding bar on the user interface. As the number of clusters for a dataset increases, the density for each cluster also increases. As such, clustering and reclustering may occur until a certain number of clusters have at or above a threshold density (e.g., 75%, 80%, 90%, etc. of clusters have above a threshold density). The clustering model 112 may therefore generate a first plurality of clusters, receive an indication from a user of a desired number of clusters, a desired density for each cluster, a desired average density for all clusters, etc., and generate one or more subsequent pluralities of clusters until one or more parameters (e.g., user preferences, density values, number of clusters, etc.) have been satisfied.

Accordingly, the density generator 114 may determine a density for each of the plurality of clusters based on an aggregate similarity of image embeddings of the cluster and determine whether the density for each of the plurality of clusters satisfies a criterion. For example, the density generator 114 may compare each of the determined densities for each of the plurality of clusters to a predetermined threshold value. Responsive to a determination that a density of a cluster is less than the predetermined threshold value, the density generator 114 may discard the cluster. Discarding the cluster may prevent the images in the cluster from being annotated by the user. That is, if a density for a cluster is below a threshold value, the cluster may be discarded because annotations for the images in the cluster generated using the vision transformer 116 may be inaccurate or the data processing system 102 can restrict the cluster from being annotated. This may be because the images in the cluster are dissimilar, so the vision transformer 116 would be unable to successfully generate annotations even with prompted images, because the prompt images would not be similar enough to the images to be annotated to provide adequate training or reference data.

In some embodiments, responsive to a determination that the density of a cluster is greater than or equal to the predetermined threshold value, a set of annotations may be automatically generated for a particular cluster without user input (e.g., a user may not input any prompt images).

In some embodiments, the density for each of the clusters satisfies the criterion based on a user input from a user. For example, the density generator 114 may present the density of a cluster to the user via the user interface 124. The density generator 114 may then receive a number of clusters from the user via a user input. The clustering model 112 may then recluster the image embeddings based on the received number of clusters. For example, the clustering model 112 may generate 10 clusters for the dataset of images. A user may desire to instead have 8 clusters (e.g., to reduce a number of images that are to be manually annotated) or 12 clusters (e.g., to increase a density value of each cluster). The clustering model 112 may recluster the image embeddings to be in accordance with the user input. In some cases, one or more clusters of the plurality of clusters generated by the clustering model 112 may have a density below a particular value. The data processing system 102 may discard (e.g., not annotated by the vision transformer 116) a cluster having a density below a particular value.

Upon generation of a final number of clusters by the clustering model 112, a user may view the clusters on the user interface 124 and manually annotate a subset of images included in each cluster. Images in a cluster may be annotated based on the density of the particular cluster satisfying a criterion as described above (e.g., satisfying a density threshold, etc.). The manual annotations may include a first set of annotations for each of one or more pixels of each of a subset of images (e.g., a defined number of image or a selected set of images) included in a cluster. The user may annotate the images by selecting points (e.g., images) and/or clusters from an interactive plot displayed on the user interface 124. The user can therefore select which cluster or clusters to annotate. Manual annotation of images may be performed by use of a brush or paint tool, a lasso tool, a segment anything model (SAM), etc. For example, when utilizing a SAM, the annotations may be automatically generated, and the user may modify pixels, delete pixels, add new pixels, etc.

Upon selecting a cluster to annotate, the user can enter, via user input on the user interface 124, a number of prompts desired to be added for the cluster. As used herein, a "prompt" may refer to an image in each cluster that a user manually annotates and provides to the vision transformer 116 as a reference for the vision transformer 116 to use when generating annotations for the remaining images in a cluster that are not used as prompts. Specifically, the prompt images are input into an in-context transformer (e.g., the vision transformer 116), which uses the images to propagate labels for pixels of other non-labeled (e.g., non-annotated) images in the cluster. As used herein, a "label" may refer to an image of the same resolution as an annotated image where each pixel has a value of "0," except for the pixels that correspond to an object of interest in the image. Accordingly, the vision transformer 116 may receive, via a user input, an indication from the user indicating a number of prompts to be used for a cluster.

The number of images per cluster that are used as prompts may be at or below a predetermined number of images, to optimize accuracy of the vision transformer 116 and time spent by a user to manually annotate the prompt images. The user many manually annotate the prompt images on a pixel level (e.g., manually annotate a plurality of pixels of each of image). Specifically, the user interface 124 may display an image overlay canvas interface to facilitate manual annotation by the user. The user interface 124 may display a number of images included in the cluster corresponding to the number of prompts indicated by the user (e.g., if the user indicates that 3 prompts will be used for a cluster, three images may be displayed). In various embodiments, the number of prompts used between clusters may be the same or different (e.g., all clusters for a dataset may use the same number of prompts, or a user may select a different number of prompts for each cluster).

In some embodiments, the vision transformer 116 may recommend a number of prompts to be used (e.g., based on a cluster density, etc.). Further, the images displayed to the user as prompt images may be selected by the vision transformer 116 (e.g., based on which images would be most useful to the vision transformer 116 to use as prompts), may be randomly selected by the vision transformer 116, may be selected by the user, etc. The user may annotate the prompt images in a variety of manners. For example, the user may draw perfect pixel-level masks, utilize loose prompts such as points and boxes and utilize a tool (e.g., Segment Anything 2, etc.) to generate masks based on the loose prompts, etc. In using loose prompts, the user may iteratively provide positive and negative points for each class, which the tool can use to generate prompt masks. The prompts may be provided to the vision transformer 116 as a first set of annotated images. As such, the vision transformer 116 may receive, via a user input, one or more annotations on each of the prompt images displayed to the user. The annotated subset of images may be input into the vision transformer 116 along with a remaining unannotated subset of images of a cluster that were not included in the annotated subset of images. That is, the annotated prompt images and the unannotated images (that are to be annotated by the vision transformer 116) are input into the vision transformer 116.

Upon receiving the first set of annotated images (e.g., the prompt images), the vision transformer 116 may generate, based on the input annotated subset of images, a plurality of annotations (e.g., pixel-level annotations) for the remaining unannotated subset of images in a cluster (e.g., only in the cluster). The vision transformer 116 may be an in-context segmentation model (e.g., SegGPT). The vision transformer 116 may include an encoder that allows multiple images to be input, including annotated images, to output masks for unannotated images. The vision transformer 116 may be trained on a large dataset of images with ground truth annotations. The vision transformer 116 may be trained to minimize a loss function.

The vision transformer 116 may be called on all of the images in a particular cluster, with the annotated prompt images being used as context by the vision transformer 116 for use in generating annotations for the unannotated images in the cluster. In various embodiments, the annotation propagator 118 may be used to perform one or more actions that have been described herein as being performed by the vision transformer 116. For example, the annotation propagator 118 may identify the output annotations of the vision transformer 116 and apply the annotations to pixels of other, unannotated images in a particular cluster. For example, the vision transformer 116 may use the input, manually annotated images to generate annotations for previously unannotated images in a cluster.

The vision transformer 116 may not generate annotations for all pixels of an image or for all images in a cluster. For example, a cluster may include 15 photos. Five of the photos in the cluster may be manually annotated input images, and seven of the photos may be annotated by the vision transformer 116. The annotation propagator 118 may identify the annotations made by the vision transformer 116 and use the information to apply annotations to the individual pixels in the remaining three images in the cluster.

The annotations generated by the vision transformer 116 (and/or the annotations propagator 118) may be displayed to the user via the user interface 124. The user may then provide feedback on the vision transformer-generated annotations. For example, the user may approve one or more of the vision transformer-generated annotations for a cluster and/or provide feedback on one or more of the vision transformer-generated annotations.

Feedback may include, for example, manually adjusting the vision transformer-generated annotations, discarding the vision transformer-generated annotations and instead manually annotating the images, etc. In some embodiments, a user may select one or more points and the vision transformer 116 may automatically generate a corresponding segment and mask for the selected points (e.g., pixels). For example, the vision transformer 116 may receive a user input regarding the vision transformer generated annotations. The user input may be a manual annotation of one or more of the images (e.g., selection of one or more points). The vision transformer 116 may update at least one of the annotations based on the user input. The vision transformer 116 may also update one or more images corresponding to the updated annotations, based on the updated annotations. As stated above, the user input may be an indication or instruction for the vision transformer 116 to update one or more annotations. As such, updating the annotations may cause the vision transformer 116 to reannotate one or more of the vision transformer generated images in the cluster. In some embodiments, the updating of the annotations and reannotating of the images may be performed, at least in part, by the annotation propagator 118.

Upon satisfaction of the user with the annotations, the user may provide an indication of satisfaction. The annotation processes described above may repeat for subsequent clusters for the dataset. In various embodiments, the annotation processes described above may occur simultaneously or concurrently for some or all of the clusters for a dataset. Responsive to generating the annotations for a cluster the data repository 120 may be updated with the annotated images. In some embodiments, the data repository 120 is updated only after all of the clusters have been annotated and are satisfactory to a user. The images may be saved or stored in the data repository 120 in a proper format. The images may be used for further training of the vision transformer 116.

Though the processes described herein relate to image annotation, it should be understood that the systems and methods described herein may be applied to non-image domains. For example, the embedding model 110 may be customized to various domains to allow for clustering of any type of data. Further, prompts input to the vision transformer 116 may not just be image prompts. As such, the vision transformer 116 can use prompts to output any type of data, receive user feedback on the outputs, and update the outputs based on the feedback as needed.

For example, the systems and methods described herein may be used to, as non-limiting examples, train a dataset to train a model for automatic or semi-automatic tumor detection, to create a dataset for settlement detection from drone images, to perform automatic or semi-automatic defect detection in a manufacturing factory, to detect human intrusion from infrared camera data, to annotate datasets for self-driving cars, and the like.

In a non-limiting example, a data processing system can process dermatological images to assist dermatologists in identifying skin lesions. The data processing system receives a dataset of 10,000 dermatological images uploaded through a mobile application over a 24-hour period, where each image is a 1024×1024 pixel RGB photograph showing various skin conditions including moles, rashes, and lesions captured by patients using their smartphones. The data processing system stores these images in a distributed database and prepares them for automated analysis to support medical professionals in diagnostic workflows.

The data processing system executes a pre-trained ResNet-50 embedding model on each of the 10,000 received images using its GPU cluster, processing each photograph through multiple convolutional layers to generate a 2048-dimensional feature vector that numerically represents the visual characteristics of each skin condition. This embedding process results in 10,000 unique image embeddings stored as floating-point arrays, where each embedding captures essential visual features such as texture patterns, color distributions, and morphological characteristics of the depicted skin conditions. The data processing system then applies a k-means clustering algorithm to group these 10,000 image embeddings into 50 distinct clusters based on cosine similarity measurements between the embedding vectors, resulting in semantically meaningful groupings such as Cluster A containing 180 images of melanocytic nevi (moles) with density 0.85, Cluster B containing 220 images of seborrheic keratoses with density 0.78, Cluster C containing 150 images of inflammatory dermatitis conditions with density 0.72, and Cluster D containing 95 images of various skin artifacts with density 0.55.

The data processing system calculates density for each of the 50 clusters by computing the average pairwise cosine similarity between all image embeddings within that cluster, and then compares each determined density to a predetermined threshold value of 0.70. The data processing system determines that Clusters A, B, and C satisfy the density criterion with densities greater than or equal to 0.70, while Cluster D with density 0.55 falls below the threshold. Responsive to determining that Cluster D's density is less than the predetermined threshold value, the data processing system discards Cluster D by preventing the 95 images in the discarded cluster from being annotated by the user, effectively removing low-quality or heterogeneous image groupings from the annotation workflow. For clusters meeting the threshold, the data processing system presents the density values to the dermatologist via a user interface, receives an indication that the user wants to adjust the clustering to 45 clusters instead of 50, and reclusters the plurality of image embeddings based on the received number of clusters.

For Cluster A containing 180 mole images that satisfied the density criterion, the data processing system receives via user input an indication from the dermatologist specifying that 18 prompts should be used for this cluster, displays 18 images from Cluster A corresponding to the number of prompts indicated by the user, and receives via user input one or more annotations on each of the displayed images where the dermatologist draws precise pixel-level boundaries around suspicious areas and applies diagnostic labels such as "benign nevus," "atypical nevus," or "melanoma suspect." The data processing system stores these annotations as binary masks indicating the specific labeled pixels, then inputs the 18 annotated mole images along with the remaining 162 unannotated mole images from Cluster A into a Vision Transformer (ViT) neural network. Since Cluster A's density of 0.85 is greater than the predetermined threshold value of 0.70, the data processing system automatically generates the second plurality of annotations for this particular cluster without additional user input, producing comprehensive pixel-level annotations for the 162 remaining images through the Vision Transformer's learned patterns.

The data processing system generates comprehensive pixel-level annotations for the remaining 162 unannotated mole images in Cluster A using the Vision Transformer, then receives user input from the dermatologist regarding corrections to 12 of the automatically generated annotations where the physician identifies areas requiring refinement. The data processing system updates these 12 annotations based on the user input and updates the corresponding images with the refined annotations, where updating these annotations causes the vision transformer to reannotate the remaining images in the cluster based on the improved training data. The data processing system repeats this annotation workflow for Clusters B and C, and after generating the second plurality of annotations for Cluster C (the last cluster of the plurality of clusters meeting the density criterion), the data processing system updates the medical database with all annotated images from the processed clusters. This comprehensive approach allows the data processing system to efficiently process thousands of dermatological images while maintaining clinical accuracy through density-based cluster filtering, user-guided annotation parameters, and iterative refinement capabilities that support dermatologists in their diagnostic responsibilities.

Figure 2:
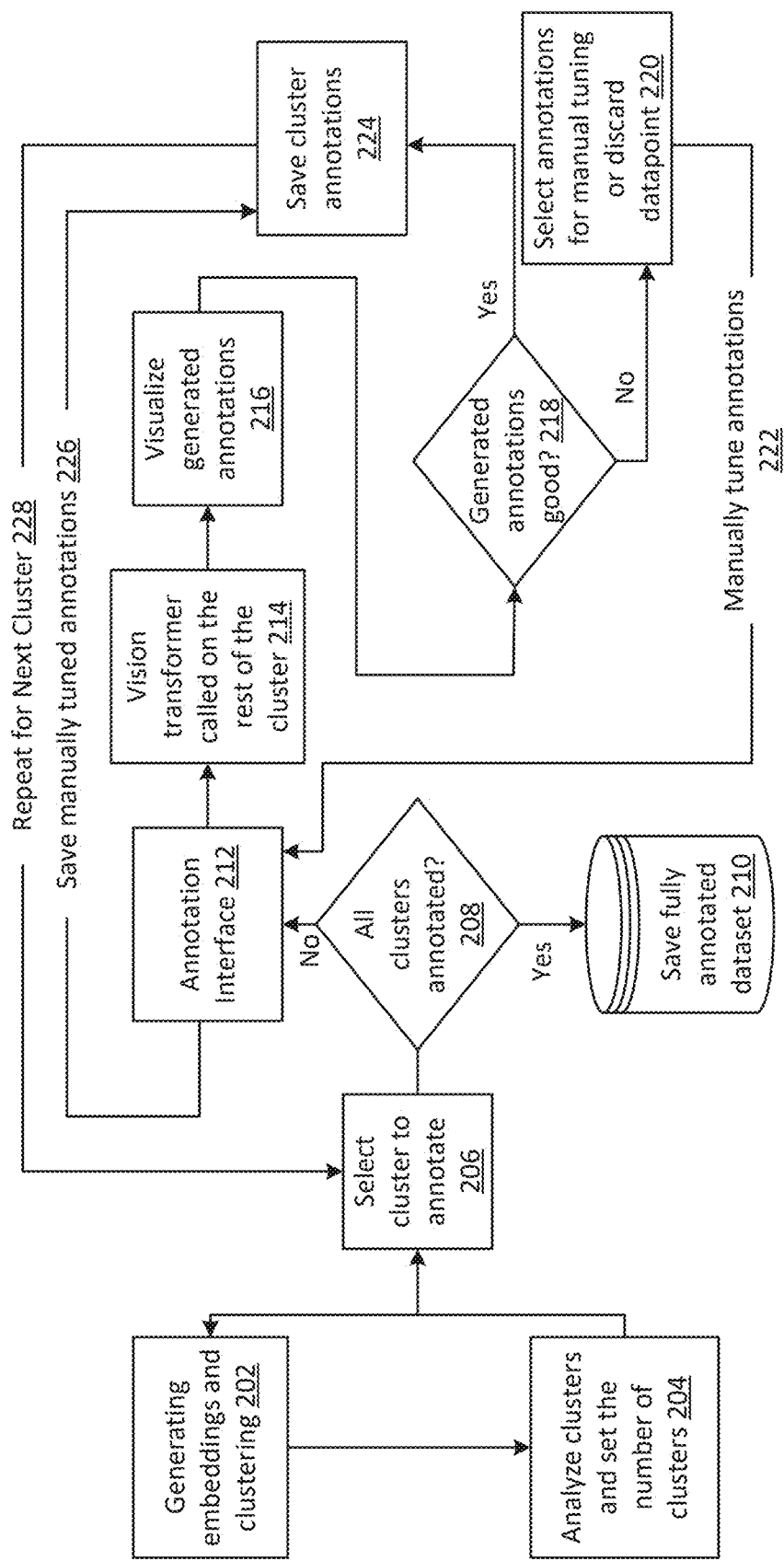
FIG. 2 is a block diagram illustrating a method for annotating a dataset using machine learning, in accordance with one or more implementations.

Referring now to FIG. 2, a method 200 for annotating a dataset using machine learning is shown, according to an example embodiment. At process 202, the embedding model 110 generates embeddings. For example, a plurality of images in a dataset are received and, for each image, the embedding model 110 generates an embedding. Also at process 202, upon generating the embeddings, the clustering model 112 clusters the generated embeddings into a plurality of clusters. The system may therefore be able to record a large amount of unlabeled data and annotate the data. The created datasets can be used to train models that may be deployed on edge devices.

At process 204, the generated clusters are analyzed and a number of clusters are set. For example, the density generator 114 may determine a density for each of the clusters, indicating a similarity of the images in a particular cluster. A user may provide feedback on a desired number of clusters, a desired density of each cluster, etc., and a final number of clusters may be set. As such, in some embodiments, when a user indicates a number of clusters should be modified relative to a current number of clusters, the method 200 may return to process 202, and the clustering model 112 may recluster the image embeddings. Upon setting a number of clusters at process 204, the method 200 continues to process 206.

At process 206, a cluster is selected to be annotated. A user selects a cluster to annotate. At process 208, it is determined whether all clusters for a dataset have been annotated. If all clusters have not been annotated, the method 200 continues to process 212. At process 212, an annotation interface is displayed to the user. The user may select one or more images in a cluster to annotate as prompt images. Upon annotating the prompt images, at process 226, the manually tuned annotations are saved. Further, upon annotating the prompt images, at process 214, the vision transformer 116 is called on the rest of the images in the cluster. The vision transformer 116 may then generate annotations for each of the remaining images in the cluster. At process 216, the generated annotations are visualized (e.g., generated and displayed to the user via the user interface 124).

At process 218, it is determined whether the annotations generated by the vision transformer 116 are good (e.g., have an acceptable accuracy, etc.). If the annotations are determined to not be good (e.g., are unsatisfactory to the user), the method 200 continues to process 220. At process 220, the user selects annotations for manual tuning or discarding. That is, the user may determine whether to manually adjust the unsatisfactory annotation or annotations, or remove the annotations altogether. At process 222, the user manually tunes the annotations, and the method 200 returns to process 212, where the annotation interface displays the images that are having their annotations manually tuned.

Responsive to a determination at process 218 that the vision transformer generated annotations are good (e.g., satisfactory to a user), the method 200 proceeds to process 224, where the annotations for a cluster are saved. For example, the annotations may be saved in the data repository 120. Subsequent to saving the cluster annotations, the method 200 continues to process 228, where the processes 206-226 are repeated for a next or subsequent cluster. That is, upon annotating all images in one cluster, at process 206, the user may select a next cluster to annotate. When it is determined, at process 208, that all clusters have been annotated, the fully annotated dataset is saved at process 210 (e.g., in the data repository 120).

Figure 3:
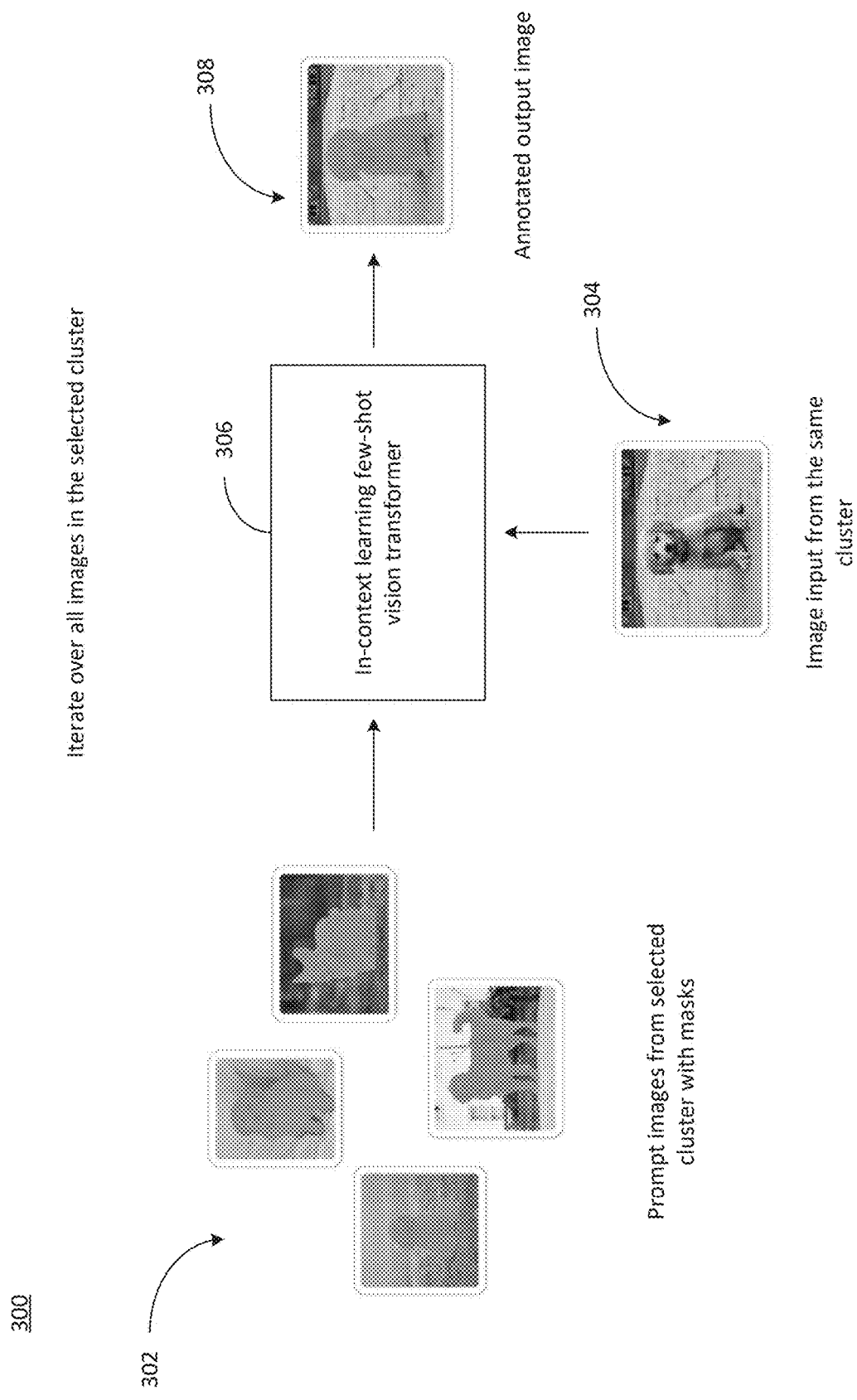
FIG. 3 is a flow diagram illustrating a process for annotating a dataset using machine learning, in accordance with one or more implementations.

Referring now to FIG. 3, a flow diagram illustrating a method 300 for annotating a dataset using machine learning is shown, according to an example embodiment. The method 300 shows a plurality of annotated prompt images 302. As shown, a user has manually annotated pixels of each of the prompt images 302 such that an object of interest in each image (e.g., a dog as shown in FIG. 3) is masked and identified. The prompt images 302 are input into an in-context learning few-shot vision transformer 306 (e.g., the vision transformer 116). An unannotated image 304 from the same cluster as the annotated prompt images 302 is also input into the vision transformer 306. As shown, the unannotated input image 304 is from the same cluster as the annotated prompt images 302 and includes the same type of object of interest as the annotated prompt images 302 (e.g., a dog). The vision transformer 306 uses the annotated prompt images 302 to annotate the unannotated image 304. As shown, the vision transformer 306 outputs an annotated output image 308. The annotated output image 308 is the same image as the unannotated image 304, but with annotations generated by the vision transformer 306. The vision transformer 306 may use the annotated prompt images 302 and iterate over all images in a selected cluster to generate a plurality of annotated output images 308 from a plurality of unannotated input images 304.

Figure 4:
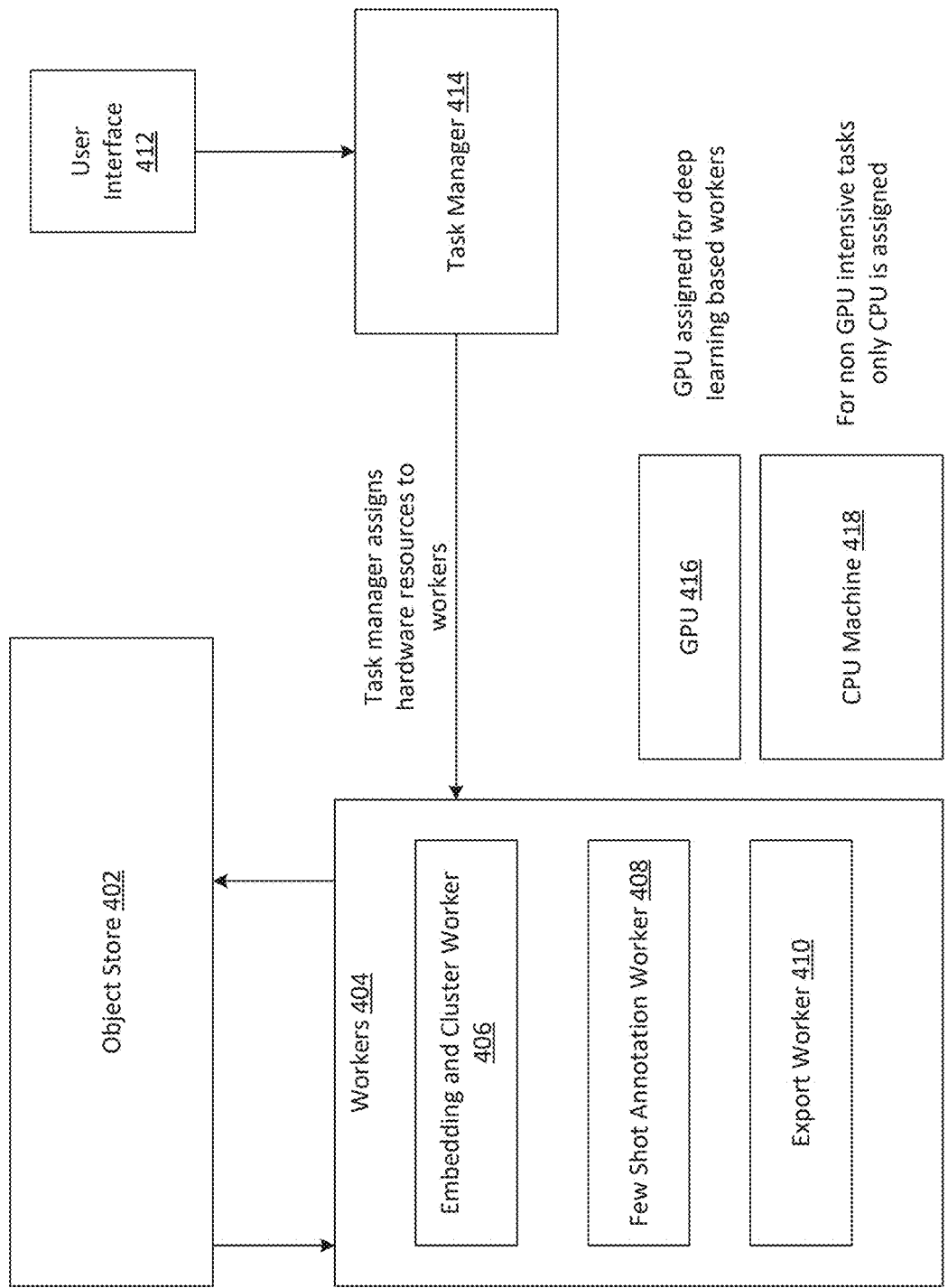
FIG. 4 is a block diagram illustrating a system for annotating a dataset using machine learning, in accordance with one or more implementations.

Referring now to FIG. 4, a system 400 for annotating a dataset using machine learning is shown, according to an example embodiment. The system 400 may be the same as or similar to the system 100 shown and described with respect to FIG. 1.

As shown, the system 400 includes an object store 402. The object store may be the same as or similar to the data repository 120 and may store one or more image datasets. The object store 402 may store both unannotated datasets (e.g., datasets that have not yet been annotated or input into a vision transformer) and annotated datasets (e.g., datasets that have been annotated and output by a vision transformer).

The system 400 includes a plurality of workers 404. The workers 404 may be models, circuits, systems, etc., configured to perform various tasks to generate annotated images.

As such, the workers 404 may be or include the circuits 110-118 described with respect to FIG. 1.

As shown, the system 400 includes an embedding and cluster worker 406. The embedding and cluster worker 406 may include functions the same as or similar to the embedding model 110, the clustering model 112, and the density generator 114. That is, the embedding and cluster worker 406 may receive a dataset from the object store 402, generate embeddings for each of the images within the dataset, and cluster (and, in some embodiments, recluster) the generated embeddings into a plurality of clusters. The embedding and cluster worker 406 may also determine densities for each of the generated clusters.

The few shot annotation worker 408 may be the same as or similar to the vision transformer 116. The few shot annotation worker may receive manual annotations of prompt images. For example, a user may upload or perform manual annotation via the user interface 412, and the annotations may be received by the few shot annotation worker 408. The task manager 414 may assign hardware resources to workers 404 and cause the annotated images to be received from the user interface 412 and transmitted to the correct worker(s) 404. The few shot annotation worker 408 may use the prompt images to generate annotations for the remaining unannotated images in the dataset.

The export worker 410 may export the generated annotations to the user interface 412 via the task manager 414. The user may receive the annotated images and provide any feedback (e.g., deletion of annotations, new annotations, updated annotations, etc.). The export worker 410 may also transmit a finalized, annotated cluster of images and/or entire dataset to the object store 402.

The GPU 416 may be assigned for deep-learning based workers. That is, the GPU 416 may be used by the few shot annotation worker 408 that uses deep learning to generate annotations from prompt images. Specifically, the GPU 416 may accelerate backend deep learning models for fast interference. The CPU machine 418 may be used for non-GPU intensive tasks, such as embedding and clustering by the embedding and cluster worker 406 and exporting tasks by the export worker 410.

Figure 5:
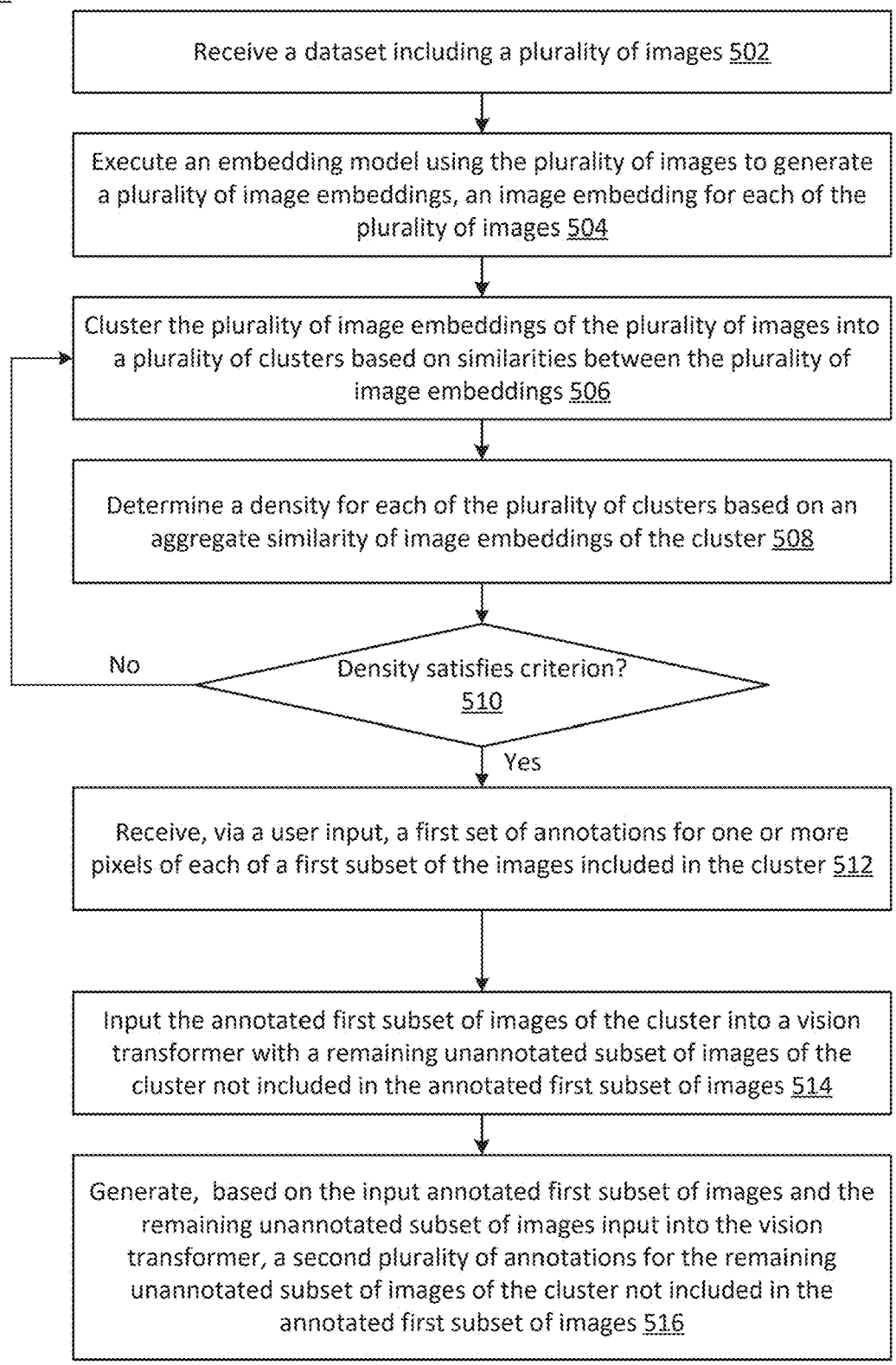
FIG. 5 is a flow chart illustrating a method for annotating a dataset using machine learning.

Referring now to FIG. 5, a flow chart illustrating a method 500 for annotating a dataset using machine learning is shown, according to an example embodiment. The method 500 can be executed, performed, or otherwise carried out by any of the computing systems or devices described herein (e.g., the data processing system 102 of FIG. 1, the computing system 600 of FIG. 6, etc.). In brief overview of the method 500, the method 500 can include receiving, at step 502, a dataset including a plurality of images, executing, at step 504, an embedding model to generate a plurality of image embeddings, clustering, at step 506, the plurality of image embeddings into a plurality of clusters, determining, at step 508, a density for each cluster, receiving, at step 510, a first set of annotations for each of a first subset of images included in each cluster, inputting, at step 512, the annotated images into a vision transformer, and generating, at step 514, a second plurality of annotations for the remaining unannotated images in the cluster.

Referring to the method 500 in greater detail, at step 502, a dataset is received that includes a plurality of images. The dataset may be received, for example, by the embedding model 110 or another component of the data processing system 102. At step 504, an embedding model (e.g., the embedding model 110) is executed using the plurality of images included in the received dataset. The embedding model 110 uses the plurality of images to generate a plurality of image embeddings. One image embedding is generated for each image of the plurality of images.

At step 506, the plurality of image embeddings of the plurality of images are clustered. The clustering of the image embeddings may be performed by, for example, the clustering model 112. The clustering model 112 may cluster the plurality of image embeddings into a plurality of clusters based on similarities between the plurality of image embeddings. As such, each of the image embeddings included in a particular cluster of the plurality of clusters may each have a similarity score at or above a threshold value. The similarity score may indicate a similarity of the image embedding to the remaining image embeddings. That is, image embeddings that are similar (e.g., have a similarity score above a threshold value) may be clustered into the same cluster.

At step 508, a density is determined for each of the plurality of clusters. The densities may be determined by, for example, the density generator 114. The density generator 114 may determine the density for each of the clusters based on an aggregate similarity of image embeddings in the cluster.

At step 510, the density generator 114 determines whether the determined density for each cluster of the plurality of clusters satisfies a criterion. The density for each of the plurality of clusters may satisfy the criterion when the density is greater than or equal to a threshold value. The density generator 114 may determine whether the determined density satisfies the criterion by comparing each of the determined densities for each of the plurality of clusters to a predetermined threshold value (e.g., a threshold density value). The density generator 114 may discard a cluster responsive to a determination that a density of a cluster is less than the predetermined threshold value. In various embodiments, discarding the cluster includes preventing the images in the discarded cluster from being annotated by the user.

In various embodiments, if a cluster density does not satisfy the criterion at step 510, the method 500 may return to step 506, and the plurality of image embeddings may be reclustered (e.g., into different clusters) so that a new density of the cluster may satisfy the criterion.

In some embodiments, the density for each of the plurality of clusters is determined to satisfy the criterion based on a user input from a user. In some embodiments, for each cluster of the plurality of clusters, the density generator 114 presents the density to the user via a user interface. The density generator 114 may receive a number of clusters from the user interface via a user input, and recluster the plurality of image embeddings based on the received number of clusters.

Steps 512-516 may be performed responsive to a determination at step 510 that the density of a cluster satisfies the criterion. Further, the steps 512-516 may be performed for each cluster of the plurality of clusters determined to have a density that satisfies the criterion. As such, the steps 512-516 may occur for one cluster and repeat for each other cluster satisfying the criterion at step 510. In various embodiments, the steps 512-516 may occur concurrently or simultaneously for each cluster.

At step 512, the data processing system receives, via a user input, a first set of annotations. The first set of annotations are for one or more pixels of each of a first subset of the images included in a cluster. As such, the first subset of images may be annotated. In some embodiments, receiving the first set of annotations includes receiving, via the user input, an indication from the user indicating a number of prompts to be used for a cluster. The data processing system 102 displays, to the user, a number of images included in the cluster corresponding to the number of prompts indicated by the user. The data processing system then receives, via the user input, one or more annotations on each of the displayed images, the one or more annotations included in the first set of annotations.

At step 514, the annotated first subset of images for a cluster are input into a vision transformer (e.g., the vision transformer 116). In addition, a remaining unannotated subset of images of the cluster that are not included in the annotated first subset of images are also input into the vision transformer 116.

At step 516, the vision transformer 116 (and/or, in some embodiments, the annotation propagator 118) generates a second plurality of annotations for the remaining unannotated subset of images of the cluster not included in the annotated first subset of images. The vision transformer 116 may generate the second plurality of annotations based on the input annotated first subset of images and the remaining unannotated subset of images input into the vision transformer 116 at step 514. In some embodiments, responsive to generating the second plurality of annotations for a last cluster of the plurality of clusters, the vision transformer 116 and/or the annotation propagator 118 may update the database (e.g., data repository 120) with the annotated plurality of images. In some embodiments, the vision transformer 116 and/or the annotation propagator 118 may automatically generate the second plurality of annotations for a particular cluster without user input. The automatic generation may occur responsive to a determination that the density of the cluster is greater than or equal to the predetermined threshold value (e.g., at step 510).

In some embodiments, the vision transformer 116 receives a user input regarding the second plurality of annotations. The vision transformer 116 updates at least one of the second plurality of annotations based on the user input. Updating the at least one of the second plurality of annotations causes the vision transformer 116 to reannotate the remaining images in the cluster. The vision transformer 116 and/or the annotation propagator 118 may then update one or more images corresponding to the updated at least one of the second plurality of annotations based on the updated annotations. For example, a user may review the second plurality of annotations generated by the vision transformer 116 and identify one or more corrections to be made to at least one of the annotations. The user may provide an input correcting the at least one annotation, and the vision transformer 116 and/or the annotation propagator 118 may update the annotations and images accordingly.

Figure 6:
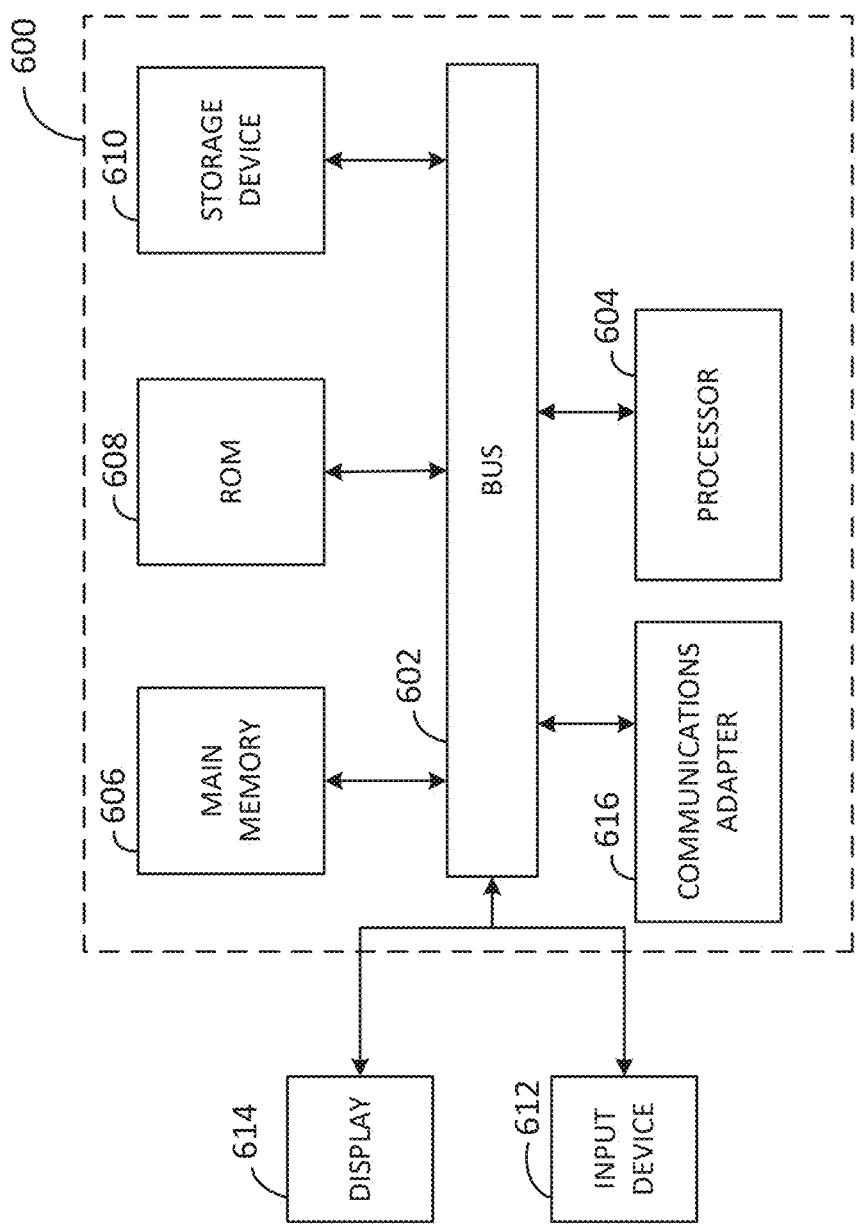
FIG. 6 illustrates a block diagram of an example computing system suitable for use in the various arrangements described herein, in accordance with one or more implementations.

FIG. 6 is a component diagram of an example computing system suitable for use in the various implementations described herein, according to an example implementation. For example, the computing system 600 may implement the data processing system 102, or one or more of the processing components (or a portion thereof) of FIG. 1, or various other example systems and devices described in the present disclosure.

The computing system 600 includes a bus 602 or other communication component for communicating information and a processor 604 coupled to the bus 602 for processing information. The computing system 600 also includes main memory 606, such as a RAM or other dynamic storage device, coupled to the bus 602 for storing information, and instructions to be executed by the processor 604. Main memory 606 can also be used for storing position information, temporary variables, or other intermediate information during execution of instructions by the processor 604. The computing system 600 may further include a ROM 608 or other static storage device coupled to the bus 602 for storing static information and instructions for the processor 604. A storage device 610, such as a solid-state device, magnetic disk, or optical disk, is coupled to the bus 602 for persistently storing information and instructions.

The computing system 600 may be coupled via the bus 602 to a display 614, such as a liquid crystal display, or active-matrix display, for displaying information to a user. An input device 612, such as a keyboard including alphanumeric and other keys, may be coupled to the bus 602 for communicating information, and command selections to the processor 604. In another implementation, the input device 612 has a touch screen display. The input device 612 can include any type of biometric sensor, or a cursor control, such as a mouse, a trackball, or cursor direction keys, for communicating direction information and command selections to the processor 604 and for controlling cursor movement on the display 614.

In some implementations, the computing system 600 may include a communications adapter 616, such as a networking adapter. Communications adapter 616 may be coupled to bus 602 and may be configured to enable communications with a computing or communications network or other computing systems. In various illustrative implementations, any type of networking configuration may be achieved using communications adapter 616, such as wired (e.g., via Ethernet), wireless (e.g., via Wi-Fi, Bluetooth), satellite (e.g., via GPS) pre-configured, ad-hoc, LAN, WAN, and the like.

One embodiment relates to a method. The method includes: receiving, by one or more processors, a dataset including a plurality of images, executing, by the one or more processors, an embedding model using the plurality of images to generate a plurality of image embeddings, an image embedding for each of the plurality of images, clustering, by the one or more processors, the plurality of image embeddings of the plurality of images into a plurality of clusters based on similarities between the plurality of image embeddings, determining, by the one or more processors, a density for each of the plurality of clusters based on an aggregate similarity of image embeddings of the cluster, based on the density for each of the plurality of clusters satisfying a criterion, for each cluster of the plurality of clusters: receiving, by the one or more processors, via a user input, a first set of annotations for one or more pixels of each of a first subset of the images included in the cluster, inputting, by the one or more processors, the annotated first subset of images of the cluster into a vision transformer with a remaining unannotated subset of images of the cluster not included in the annotated first subset of images, and generating, by the one or more processors, based on the input annotated first subset of images and the remaining unannotated subset of images input into the vision transformer, a second plurality of annotations for the remaining unannotated subset of images of the cluster not included in the annotated first subset of images.

In some embodiments, each of the image embeddings included in a particular cluster of the plurality of clusters each have a similarity score at or above a threshold value, the similarity score indicating a similarity of the image embedding to other image embeddings of the cluster. In some embodiments, the method further includes: comparing, by the one or more processors, each of the determined densities for each of the plurality of clusters to a predetermined threshold value, and discarding, by the one or more processors, responsive to a determination that a density of a cluster is less than the predetermined threshold value, the cluster. In some embodiments, discarding the cluster includes: preventing the images in the discarded cluster from being annotated by the user.

In some embodiments, the method further includes: comparing, by the one or more processors, each of the determined densities for each of the plurality of clusters to a predetermined threshold value, and automatically generating the second plurality of annotations for a particular cluster without user input, responsive to a determination that the density of the cluster is greater than or equal to the predetermined threshold value. In some embodiments, the method further includes: receiving, by the one or more processors, a user input regarding the second plurality of annotations, updating, by the one or more processors, at least one of the second plurality of annotations based on the user input, and updating, by the one or more processors, one or more images corresponding to the updated at least one of the second plurality of annotations based on the updated annotations.

In some embodiments, updating the at least one of the second plurality of annotations causes the vision transformer to reannotate the remaining images in the cluster. In some embodiments, receiving the first set of annotations includes: receiving, via the user input, an indication from the user indicating a number of prompts to be used for a cluster, displaying, to the user, a number of images included in the cluster corresponding to the number of prompts indicated by the user, and receiving, via the user input, one or more annotations on each of the displayed images, the one or more annotations included in the first set of annotations.

In some embodiments, the density for each of the plurality of clusters satisfies the criterion based on a user input from a user. In some embodiments, the method includes, for each cluster of the plurality of clusters: presenting the density to the user via a user interface, receiving an indication of a number of clusters from the user interface via a user input, and reclustering the plurality of image embeddings based on the received number of clusters. In some embodiments, the method further includes: responsive to generating the second plurality of annotations for a last cluster of the plurality of clusters, updating the database with the annotated plurality of images.

At least one aspect relates to a system. The system includes one or more non-transitory computer-readable media storing instructions thereon that, when executed by one or more processors, cause the one or more processors to: receive a dataset including a plurality of images, execute an embedding model using the plurality of images to generate a plurality of image embeddings, an image embedding for each of the plurality of images, cluster the plurality of image embeddings of the plurality of images into a plurality of clusters based on similarities between the plurality of image embeddings, determine a density for each of the plurality of clusters based on an aggregate similarity of image embeddings of the cluster, based on the density for each of the plurality of clusters satisfying a criterion, for each cluster of the plurality of clusters, receive, via a user input, a first set of annotations for one or more pixels of each of a first subset of the images included in the cluster, input the annotated first subset of images of the cluster into a vision transformer with a remaining unannotated subset of images of the cluster not included in the annotated first subset of images, and generate, based on the input annotated first subset of images and the remaining unannotated subset of images input into the vision transformer, a second plurality of annotations for the remaining unannotated subset of images of the cluster not included in the annotated first subset of images.

In some embodiments, each of the image embeddings included in a particular cluster of the plurality of clusters each have a similarity score at or above a threshold value, the similarity score indicating a similarity of the image embedding to the remaining image embeddings.

In some embodiments, the instructions further cause the one or more processors to compare each of the determined densities for each of the plurality of clusters to a predetermined threshold value.

In some embodiments, the instructions further cause the one or more processors to: discard, responsive to a determination that a density of a cluster is less than the predetermined threshold value, the cluster.

In some embodiments, the second plurality of annotations for a particular cluster are generated automatically without user input responsive to a determination that the density of the cluster is greater than or equal to the predetermined threshold value.

In some embodiments, the instructions further cause the one or more processors to: receive a user input regarding the second plurality of annotations; update at least one of the second plurality of annotations based on the user input; and update one or more images corresponding to the updated at least one of the second plurality of annotations based on the updated annotations.

In some embodiments, receiving the first set of annotations includes: receiving, via the user input, an indication from the user indicating a number of prompts to be used for a cluster; displaying, to the user, a number of images included in the cluster corresponding to the number of prompts indicated by the user; and receiving, via the user input, one or more annotations on each of the displayed images, the one or more annotations included in the first set of annotations.

In some embodiments, the density for each of the plurality of clusters satisfies the criterion based on a user input from a user, and the instructions further cause the one or more processors to, for each cluster of the plurality of clusters: present the density to the user via a user interface; receive a number of clusters from the user interface via a user input; and recluster the plurality of image embeddings based on the received number of clusters.

At least one aspect relates to one or more non-transitory computer-readable media storing instructions thereon that, when executed by one or more processors, cause the one or more processors to perform operations including: receiving a dataset including a plurality of images; executing an embedding model using the plurality of images to generate a plurality of image embeddings, an image embedding for each of the plurality of images; clustering the plurality of image embeddings of the plurality of images into a plurality of clusters based on similarities between the plurality of image embeddings; determining a density for each of the plurality of clusters based on an aggregate similarity of image embeddings of the cluster; based on the density for each of the plurality of clusters satisfying a criterion, for each cluster of the plurality of clusters: receiving, via a user input, a first set of annotations for one or more pixels of each of a first subset of the images included in the cluster; inputting the annotated first subset of images of the cluster into a vision transformer with a remaining unannotated subset of images of the cluster not included in the annotated first subset of images; and generating, based on the input annotated first subset of images and the remaining unannotated subset of images input into the vision transformer, a second plurality of annotations for the remaining unannotated subset of images of the cluster not included in the annotated first subset of images.

According to various implementations, the processes of the illustrative implementations that are described herein can be achieved by the computing system 600 in response to the processor 604 executing an implementation of instructions contained in main memory 606. Such instructions can be read into main memory 606 from another computer-readable medium, such as the storage device 610. Execution of the implementation of instructions contained in main memory 606 causes the computing system 600 to perform the illustrative processes described herein. One or more processors in a multi-processing implementation may also be employed to execute the instructions contained in main memory 606. In alternative implementations, hard-wired circuitry may be used in place of or in combination with software instructions to implement illustrative implementations. Thus, implementations are not limited to any specific combination of hardware circuitry and software.

The implementations described herein have been described with reference to drawings. The drawings illustrate certain details of specific implementations that implement the systems, methods, and programs described herein. However, describing the implementations with drawings should not be construed as imposing on the disclosure any limitations that may be present in the drawings.

It should be understood that no claim element herein is to be construed under the provisions of 35 U.S.C. § 112 (f), unless the element is expressly recited using the phrase "means for."

As used herein, the term "circuit" may include hardware structured to execute the functions described herein. In some implementations, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some implementations, a circuit may take the form of one or more analog circuits, electronic circuits (e.g., integrated circuits (IC), discrete circuits, system on a chip (SOC) circuits, telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring, and so on.

The "circuit" may also include one or more processors communicatively coupled to one or more memory or memory devices. In this regard, the one or more processors may execute instructions stored in the memory or may execute instructions otherwise accessible to the one or more processors. In some implementations, the one or more processors may be embodied in various ways. The one or more processors may be constructed in a manner sufficient to perform at least the operations described herein. In some implementations, the one or more processors may be shared by multiple circuits (e.g., circuit A and circuit B may comprise or otherwise share the same processor, which, in some example implementations, may execute instructions stored, or otherwise accessed, via different areas of memory). Alternatively or additionally, the one or more processors may be structured to perform or otherwise execute certain operations independent of one or more co-processors.

In other example implementations, two or more processors may be coupled via a bus to enable independent, parallel, pipelined, or multi-threaded instruction execution. Each processor may be implemented as one or more general-purpose processors, ASICs, FPGAs, GPUS, TPUs, digital signal processors (DSPs), or other suitable electronic data processing components structured to execute instructions provided by memory. The one or more processors may take the form of a single core processor, multi-core processor (e.g., a dual core processor, triple core processor, or quad core processor), microprocessor, etc. In some implementations, the one or more processors may be external to the apparatus, for example, the one or more processors may be a remote processor (e.g., a cloud-based processor). Alternatively or additionally, the one or more processors may be internal or local to the apparatus. In this regard, a given circuit or components thereof may be disposed locally (e.g., as part of a local server, a local computing system) or remotely (e.g., as part of a remote server such as a cloud based server). To that end, a "circuit" as described herein may include components that are distributed across one or more locations.

An exemplary system for implementing the overall system or portions of the implementations might include a general purpose computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile or non-volatile memories), etc. In some implementations, the non-volatile media may take the form of ROM, flash memory (e.g., flash memory such as NAND, 3D NAND, NOR, 3D NOR), EEPROM, MRAM, magnetic storage, hard discs, optical discs, etc. In other implementations, the volatile storage media may take the form of RAM, TRAM, ZRAM, etc. Combinations of the above are also included within the scope of machine-readable media. In this regard, machine-executable instructions comprise, for example, instructions and data, which cause a general-purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example implementations described herein.

It should also be noted that the term "input devices," as described herein, may include any type of input device including, but not limited to, a keyboard, a keypad, a mouse, joystick, or other input devices performing a similar function. Comparatively, the term "output device," as described herein, may include any type of output device including, but not limited to, a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative implementations. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps, and decision steps.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements, and features discussed only in connection with one implementation are not intended to be excluded from a similar role in other implementations.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act, or element may include implementations where the act or element is based at least in part on any information, act, or element.

Any implementation disclosed herein may be combined with any other implementation, and references to "an implementation," "some implementations," "an alternate implementation," "various implementation," "one implementation," or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The foregoing description of implementations has been presented for purposes of illustration and description. It is not intended to be exhaustive or to limit the disclosure to the precise form disclosed, and modifications and variations are possible in light of the above teachings or may be acquired from this disclosure. The implementations were chosen and described in order to explain the principals of the disclosure and its practical application to enable one skilled in the art to utilize the various implementations and with various modifications as are suited to the particular use contemplated. Other substitutions, modifications, changes, and omissions may be made in the design, operating conditions and implementation of the implementations without departing from the scope of the present disclosure as expressed in the appended claims.

What is claimed is:

1. A method comprising:
   receiving, by one or more processors, a dataset comprising a plurality of images;
   executing, by the one or more processors, an embedding model using the plurality of images to generate a plurality of image embeddings, an image embedding for each of the plurality of images;
   clustering, by the one or more processors, the plurality of image embeddings of the plurality of images into a plurality of clusters based on similarities between the plurality of image embeddings;
   determining, by the one or more processors, a density for each of the plurality of clusters based on an aggregate similarity of image embeddings of the cluster; and
   based on the density for each of the plurality of clusters satisfying a criterion, for each cluster of the plurality of clusters:

receiving, by the one or more processors, via a user input, a first set of annotations for one or more pixels of each of a first subset of the images included in the cluster;

inputting, by the one or more processors, the annotated first subset of images of the cluster into a vision transformer with a remaining unannotated subset of images of the cluster not included in the annotated first subset of images; and generating, by the one or more processors, based on the input annotated first subset of images and the remaining unannotated subset of images input into the vision transformer, a second plurality of annotations for the remaining unannotated subset of images of the cluster not included in the annotated first subset of images.

2. The method of claim 1, wherein each of the image embeddings included in a particular cluster of the plurality of clusters each have a similarity score at or above a threshold value, the similarity score indicating a similarity of the image embedding to other image embeddings of the cluster.

3. The method of claim 1, further comprising:
comparing, by the one or more processors, each of the determined densities for each of the plurality of clusters to a predetermined threshold value; and
discarding, by the one or more processors, responsive to a determination that a density of a cluster is less than the predetermined threshold value, the cluster.

4. The method of claim 3, wherein discarding the cluster comprises:
preventing the images in the discarded cluster from being annotated by the user.

5. The method of claim 1, further comprising:
comparing, by the one or more processors, each of the determined densities for each of the plurality of clusters to a predetermined threshold value; and
automatically generating the second plurality of annotations for a particular cluster without user input, responsive to a determination that the density of the cluster is greater than or equal to the predetermined threshold value.

6. The method of claim 1, further comprising:
receiving, by the one or more processors, a user input regarding the second plurality of annotations;
updating, by the one or more processors, at least one of the second plurality of annotations based on the user input; and
updating, by the one or more processors, one or more images corresponding to the updated at least one of the second plurality of annotations based on the updated annotations.

7. The method of claim 6, wherein updating the at least one of the second plurality of annotations causes the vision transformer to reannotate the remaining images in the cluster.

8. The method of claim 1, wherein receiving the first set of annotations comprises:
receiving, via the user input, an indication from the user indicating a number of prompts to be used for a cluster;
displaying, to the user, a number of images included in the cluster corresponding to the number of prompts indicated by the user; and
receiving, via the user input, one or more annotations on each of the displayed images, the one or more annotations included in the first set of annotations.

9. The method of claim 1, wherein the density for each of the plurality of clusters satisfies the criterion based on a user input from a user.

10. The method of claim 9, further comprising, for each cluster of the plurality of clusters:
presenting the density to the user via a user interface;
receiving an indication of a number of clusters from the user interface via a user input; and
reclustering the plurality of image embeddings based on the received number of clusters.

11. The method of claim 1, further comprising:
responsive to generating the second plurality of annotations for a last cluster of the plurality of clusters, updating a database with the annotated plurality of images.

12. A system comprising:
one or more non-transitory computer-readable media storing instructions thereon that, when executed by one or more processors, cause the one or more processors to:
receive a dataset comprising a plurality of images;
execute an embedding model using the plurality of images to generate a plurality of image embeddings, an image embedding for each of the plurality of images;
cluster the plurality of image embeddings of the plurality of images into a plurality of clusters based on similarities between the plurality of image embeddings;
determine a density for each of the plurality of clusters based on an aggregate similarity of image embeddings of the cluster; and
based on the density for each of the plurality of clusters satisfying a criterion, for each cluster of the plurality of clusters:
receive, via a user input, a first set of annotations for one or more pixels of each of a first subset of the images included in the cluster;
input the annotated first subset of images of the cluster into a vision transformer with a remaining unannotated subset of images of the cluster not included in the annotated first subset of images; and
generate, based on the input annotated first subset of images and the remaining unannotated subset of images input into the vision transformer, a second plurality of annotations for the remaining unannotated subset of images of the cluster not included in the annotated first subset of images.

13. The system of claim 12, wherein each of the image embeddings included in a particular cluster of the plurality of clusters each have a similarity score at or above a threshold value, the similarity score indicating a similarity of the image embedding to the remaining image embeddings.

14. The system of claim 12, wherein the instructions further cause the one or more processors to:
Compare each of the determined densities for each of the plurality of clusters to a predetermined threshold value.

15. The system of claim 14, wherein the instructions further cause the one or more processors to:
discard, responsive to a determination that a density of a cluster is less than the predetermined threshold value, the cluster.

16. The system of claim 14, wherein the second plurality of annotations for a particular cluster are generated automatically without user input responsive to a determination that the density of the cluster is greater than or equal to the predetermined threshold value.

17. The system of claim 12, wherein the instructions further cause the one or more processors to:
receive a user input regarding the second plurality of annotations;
update at least one of the second plurality of annotations based on the user input; and
update one or more images corresponding to the updated at least one of the second plurality of annotations based on the updated annotations.

18. The system of claim 12, wherein receiving the first set of annotations comprises:
receiving, via the user input, an indication from the user indicating a number of prompts to be used for a cluster;
displaying, to the user, a number of images included in the cluster corresponding to the number of prompts indicated by the user; and
receiving, via the user input, one or more annotations on each of the displayed images, the one or more annotations included in the first set of annotations.

19. The system of claim 12, wherein the density for each of the plurality of clusters satisfies the criterion based on a user input from a user, and wherein the instructions further cause the one or more processors to, for each cluster of the plurality of clusters:
present the density to the user via a user interface;
receive a number of clusters from the user interface via a user input; and
recluster the plurality of image embeddings based on the received number of clusters.

20. One or more non-transitory computer-readable media storing instructions thereon that, when executed by one or more processors, cause the one or more processors to perform operations comprising:
receiving a dataset comprising a plurality of images;
executing an embedding model using the plurality of images to generate a plurality of image embeddings, an image embedding for each of the plurality of images;
clustering the plurality of image embeddings of the plurality of images into a plurality of clusters based on similarities between the plurality of image embeddings;
determining a density for each of the plurality of clusters based on an aggregate similarity of image embeddings of the cluster; and
based on the density for each of the plurality of clusters satisfying a criterion, for each cluster of the plurality of clusters:
receiving, via a user input, a first set of annotations for one or more pixels of each of a first subset of the images included in the cluster;
inputting the annotated first subset of images of the cluster into a vision transformer with a remaining unannotated subset of images of the cluster not included in the annotated first subset of images; and
generating, based on the input annotated first subset of images and the remaining unannotated subset of images input into the vision transformer, a second plurality of annotations for the remaining unannotated subset of images of the cluster not included in the annotated first subset of images.

* * * * *